United States Patent Office 3,336,323
Patented Aug. 15, 1967

3,336,323
CERTAIN TETRAHYDRO AND DIHYDRO-PYRROLE DERIVATIVES OF 2-ETHYLTHIOPHENE
William C. Austin, Bishops Stortford, and John C. Danilewicz, Sandwich, England, and Lloyd H. Conover, Waterford, Conn., assignors to Chas. Pfizer & Co., Inc., New York, N.Y., a corporation of Delaware
No Drawing. Filed July 23, 1965, Ser. No. 474,463
Claims priority, application Great Britain, Aug. 13, 1964, 32,987/64
9 Claims. (Cl. 260—294.8)

This invention concerns new organic compounds having anthelmintic properties. In particular, it provides certain 2-ethylthiophen derivatives and their non-toxic acid addition salts.

The compounds of the invention are 2-ethylthiophen derivatives of the formula:

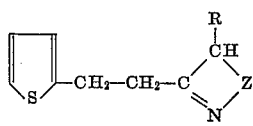

and the non-toxic acid addition salts thereof wherein R is selected from the group consisting of hydrogen and methyl; and Z is selected from the group consisting of ethylene and trimethylene.

The compounds of the invention are effective against helminths of the families Ancylostomidae, Strongylidae and Trichostrongylidae, species of which occur in the stomachs and intestines of sheep and cattle.

The 2-ethylthiophen derivatives of the invention can be prepared from a 2 - ($2^1$-halogenoethyl)thiophen by converting this halide with magnesium to a Grignard reagent, and reacting the Grignard reagent with a halogenocarboxylic acid nitrile, halogen —Z—CHR.CN, where R and Z have their previous significance. This method is described in the examples later in this specification.

The 2-ethylthiophen derivatives of the invention are bases, and can be converted by treatment with appropriate acids into nontoxic acid addition salts, such as the hydrochloride, hydrobromide, phosphate, nitrate, sulphate, acetate, citrate, maleate, gluconate, benzoate, propionate, butyrate, toluene p-sulphonate, sulphosalicylate, amsonate, pamoate, stearate, 2-hydroxy-3-naphthoate, 3-hydroxy-2-naphthoate, 3-hydroxy-2-naphthoate, suramin salt and cation exchange resin adsorbates.

The compounds of the invention can be administered alone, but will generally be administered in admixture with a nontoxic carrier selected with regard to the intended route of administration. For example, they may be administered orally as aqueous solutions or in admixture with an animal feedstuff or animal feed supplement. In parenteral administration, which is preferably carried out subcutaneously or intramuscularly, the carrier used may be aqueous, such as water, isotonic saline, isotonic dextrose or Ringer's solution; or nonaqueous, such as cottonseed oil, peanut oil, corn oil, sesame oil, glycerol, propylene glycol or sorbitol. A suitable dose is from 5 to 100 mg. (calculated as free base) of the active ingredient per kg. of body weight.

The invention is illustrated by the following examples. For convenience, the compounds of the invention will hereafter be named primarily in terms of the heterocyclic ring containing the nitrogen atom. Thus, the compound:

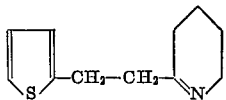

is called 2-[$2^1$-(2''-thienyl)ethyl]-$\Delta^1$-tetrahydropyridine.

EXAMPLE 1

2-[$2^1$-(2''-thienyl)ethyl]-$\Delta^1$-tetrahydropyridine

Magnesium (4.8 g.) was suspended in dry ether (200 ml.), and 2-($2^1$-chloroethyl)thiophen (28.7 g.) was added. The resultant mixture was refluxed for two hours, and 5-chlorovaleronitrile (23 g.) in dry ether (150 ml.) was then added slowly. The mixture was defluxed for 30 minutes. Xylene (150 ml.) was then added, and the ether was removed by distillation.

The mixture (now of boiling point about 150° C.) was refluxed for a further hour, and then cooled, and an aqueous solution (150 ml.) of ammonium chloride containing 100 g. NH$_4$Cl/litre was added. The upper (organic solvent) layer that separated was removed and extracted with aqueous hydrochloric acid, and the aqueous acid extract was made alkaline with sodium hydroxide. The oil that separated was dissolved in ether, the ether extract was dried, and the ether was distilled off. The residue was distilled under reduced pressure to obtain 2 - [$2^1$-(2'' - thienyl)ethyl] - $\Delta^1$-tetrahydropyridine as a pale yellow liquid, B.P. 68–69° C. under a pressure of 2×10$^{-3}$ mm. of mercury. The product was converted to the acid maleate (M.P. 78–80° C.), for which element analysis gave: C, 58.18%; H, 5.89%, N, 4.32%; S, 10.06%; $C_{15}H_{19}NO_4X$ requires: C, 58.24%; H, 6.19%, N, 4.53%; S, 10.35%.

The toluene p-sulphonate salt of the tetrahydropyridine was prepared by dissolving the base in ether and adding to the ether solution an equivalent quantity of toluene p-sulphonic acid dissolved in a mixture of methanol and ether. The oil that separated was solidified, and after several recrystallizations from a mixture of isopropanol and ether gave colorless needles of the toluene p-sulphonate salt, M.P. 101–103° C.

EXAMPLE 2

2-[$2^1$-(2''-thienyl)ethyl]-$\Delta^1$-pyrroline

The same method of preparation was used as in Example 1, except that 4-chlorobutyronitrile was used instead of 5-chlorovaleronitrile. 2-[$2^1$-(2''-thienyl)ethyl]-$\Delta^1$-pyrroline was obtained as an almost colorless oil having a boiling point of 89° C. at a pressure of 0.4 mm. mercury.

Element analysis gave: C, 67.16%; H, 7.20%; N, 7.69%; S, 17.44%; $C_{10}H_{13}NS$ requires: C, 67.04%; H, 7.30%; N, 7.80%; S, 17.86%.

The toluene p-sulphonate salt of the pyrolline, prepared by a method essentially similar to that adopted with the tetrahydropyridine of Example 1, crystallized from isopropanol in colorless plates, melting point 100–101.5° C.

EXAMPLE 3

3-methyl-2-[$2^1$-(2''-thienyl)ethyl]-$\Delta^1$-pyrolline (a) Preparation of 2-methyl-4-chlorobutyronitrile.—
A solution of the sodium derivative of propionitrile in liquid ammonia (from sodium, 20.9 g.; and propionitrile, 50 g.) was prepared following the procedure described in J. Amer. Chem. Soc., 67 (1945) 2152. 2-(tetrahydro-2-pyronyloxy)ethyl chloride (150 g.; see J. Chem. Soc. 1960, 2103) was slowly added to the solution, and the mixture was allowed to stand for 16 hours. The residue left on evaporation of ammonia was extracted with benzene, and the benzene extracts were dried (MgSO$_4$) and heated in vacuo to distil off benzene. The residue was distilled to give 2-methyl - 4 - (tetrahydro-2-pyranyloxy) butyronitrile as a colorless oil, B.P. 95–102° C. under 1.3 mm. mercury pressure; $n_D^{28}$=1.4571.

A solution of the oil (59.8 g.) in methanol (150 ml.) containing concentrated hydrochloric acid (15 ml.) was heated under reflux for 5 minutes. The solution was then cooled, neutralized with solid sodium bicarbonate, filtered, and heated to distil off methanol. The residue was distilled in vacuo to give 2-methyl-4-hydroxybutyronitrile as a colorless oil, B.P. 116–118° C.

Thionyl chloride (36.8 g.) was added dropwise with stirring to a solution of 2-methyl-4-hydroxybutyronitrile (27.8 g.) in dry benzene (100 ml.) with cooling (ice-bath). The mixture was stirred at room temperature for a further 3 hours, and heated in vacuo to distil off benzene and excess thionyl chloride. The residue was distilled to give 2-methyl-4-chlorobutyronitrile, B.P. 80–84° C. under 15 mm. mercury pressure.

Analysis.—Calcd. for $C_5H_8ClN$: C, 51.12%; H, 6.81%; N, 11.92%. Found: C, 51.52%; H, 7.21%; N, 11.77%.

(b) Reaction of 2-methyl-4-chlorobutyronitrile with Grignard reagent from 2 - ($2^1$ - chloroethyl) thiophen.— This was carried out following generally the procedure of Example 1, with the difference that 2-methyl - 4 - chlorobutyronitrile was used instead of 5-chlorovaleronitrile, and 3-methyl-2-[$2^1$-(2″-thienyl)ethyl]-$\Delta^1$-pyrroline was obtained as a colorless oil, B.P. 98–102° C. under a pressure of 0.5 mm. of mercury.

The toluene p-sulphonate salt, obtained following generally the procedure of Example 1, formed colorless crystals, M.P. 105–106.5° C. (from isopropanol-ether).

Analysis.—Calcd. for $C_{18}H_{23}NO_3S_2$: C, 59.18; H, 6.33; N, 3.83; S, 17.52%. Found: C, 59.19; H, 6.10; N, 3.64; S, 17.62%.

EXAMPLE 4

3-methyl-2-[$2^1$-(2″-thienyl)ethyl]-$\Delta^1$tetrahydropyridine (a) Preparation of 2-methyl-5-chlorovaleronitrile.— This was prepared following generally the procedure of (a) in Example 3, using as initial reactants propionitrile and 3-(tetrahydro-2-pyranyloxy)propyl chloride. It had B.P. 98–100° C. under a pressure of 14 mm. of mercury.

(b) Reaction of 2-methyl-5-chlorovaleronitrile with Grignard reagent from 2 - ($2^1$ - chloroethyl) thiophen.— This was carried out following generally the procedure of Example 1, with the difference that 2-methyl-5-chlorovaleronitrile was used instead of 5-chlorovaleronitrile, and 3 - methyl-2[$2^1$-(2″-thienyl)ethyl]-$\Delta^1$-tetrahydropyridine was obtained as a colorless oil, B.P. 121–123° C. under a pressure of 0.1 mm. of mercury.

The toluene p-sulphonate salt, obtained following generally the procedure of Example 1, formed colorless crystals; M.P. 128–130° C. (from isopropanol-ether).

Analysis.—Calcd. for $C_{19}H_{25}NO_3S_2$: C, 60.14; H, 6.64; N, 3.69; S, 16.88%. Found: C, 60.33; H, 6.64; N, 3.65; S, 16.89%.

EXAMPLE 5

The free bases of Examples 1–4 are converted to acid addition salts by treatment with an equimolar proportion of the appropriate acid in methanol as solvent. The salts are recovered by precipitation with a non-solvent, e.g., ether, hexane, or, alternatively, if desired, by evaporation of the solvent. The following acid addition salts can thus be prepared: sulphosalicylate, pamoate, amsonate, 2-hydroxy-3-naphthoate, stearate, citrate, maleate, gluconate, benzoate, acetate, propionate, butyrate, sulfate, nitrate, phosphate, hydrobromide, t-butylacetate, trimethylacetate, oxalate, succinate, maleate and tartrate.

EXAMPLE 6

The resin adsorbates can be prepared as follows. The hydrochloride salts of the herein described bases are dissolved in water and the solution added to a well-stirred suspension of the sodium form of Amberlite IR–176 (sulfonated polystyrene cross-linked with 1% divinylbenzene), 200–400 mesh. The suspension is stirred for about 3 hours, filtered, washed with water and dried in vacuo.

Alternatively, an aqueous solution of the hydrochlorides, acetates, citrates or other water soluble salt of the bases described herein, are percolated through a column of 200–400 mesh Dowex 50–X2 (sulfonated polystyrene cross-linked with 2% divinylbenzene, available from the Dow Chemical Company) until the concentration of the eluate corresponds to that of the solution being treated. The resin is then washed with water, removed from the column and dried.

What we claim is:

1. A compound having the formula:

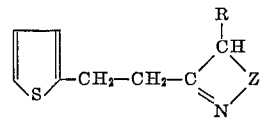

and the nontoxic acid addition salts thereof wherein R is selected from the group consisting of hydrogen and methyl; and Z is selected from the group consisting of ethylene and trimethylene.

2. 2-[$2^1$-(2″-thienyl)ethyl]-$\Delta^1$-tetrahydropyridine.

3. 2-[$2^1$-(2″-thienyl)ethyl]-$\Delta^1$-tetrahydropyridine toluene p-sulphonate.

4. 3-methyl - 2 - [$2^1$-(2″-thienyl)ethyl]-$\Delta^1$-tetrahydropyridine hydrochloride.

5. 3-methyl - 2 - [$2^1$-(2″-thienyl)ethyl]-$\Delta^1$-tetrahydropyridine toluene p-sulphonate.

6. 2-[$2^1$-(2″-thienyl)ethyl]-$\Delta^1$-pyrolline pamoate.

7. 2-[$2^1$-(2″-thienyl)ethyl] - $\Delta^1$ - pyrolline toluene p-sulphonate.

8. 3-methyl - 2 - [$2^1$ - (2″-thienyl)ethyl]-$\Delta^1$-pyrolline citrate.

9. 3-methyl-2-[$2^1$-(2″ - thienyl)ethyl] - $\Delta^1$ - pyrolline toluene p-sulphonate.

References Cited

UNITED STATES PATENTS 2,526,319   10/1950   Beatty _____ 260—294.8 XR

WALTER A. MODANCE, Primary Examiner.

A. L. ROTMAN, Assistant Examiner.